United States Patent
Reimann et al.

(10) Patent No.: US 10,764,808 B2
(45) Date of Patent: Sep. 1, 2020

(54) METHOD FOR PERFORMING A HANDOVER PROCESS FOR A MOBILE RADIO NETWORK TERMINAL IN A MOBILE RADIO NETWORK, CORRESPONDING APPARATUSES FOR PERFORMING THE METHOD, TRANSPORTATION VEHICLE AND CORE NETWORK MANAGEMENT DEVICE, AND CORRESPONDING COMPUTER PROGRAMS

(71) Applicant: VOLKSWAGEN AKTIENGESELLSCHAFT, Wolfsburg (DE)

(72) Inventors: Daniel Reimann, Braunschweig (DE); Guillaume Jornod, Berlin (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 0 days.

(21) Appl. No.: 16/679,946

(22) Filed: Nov. 11, 2019

(65) Prior Publication Data

US 2020/0162990 A1     May 21, 2020

(30) Foreign Application Priority Data

Nov. 16, 2018     (EP) .................................. 18206635

(51) Int. Cl.
*H04W 36/32*       (2009.01)
*G08G 1/01*        (2006.01)
(Continued)

(52) U.S. Cl.
CPC ............ *H04W 36/32* (2013.01); *G08G 1/012* (2013.01); *G08G 1/096827* (2013.01);
(Continued)

(58) Field of Classification Search
CPC ..................................................... H04W 36/32
(Continued)

(56) References Cited

U.S. PATENT DOCUMENTS

2001/0034239 A1*  10/2001  Yamato ............ G08G 1/096775
                                                     455/456.6
2004/0058678 A1    3/2004  deTorbal
(Continued)

FOREIGN PATENT DOCUMENTS

DE     102016226045 A1    6/2018
EP        2088818 A2      8/2009
(Continued)

OTHER PUBLICATIONS

3GPP; TR 36.788; 3rd Generation Partnership Project; Technical Specification Group Radio Access Network; Vehicle-to-Everything (V2X) Phase 2; User Equipment (UE) radio transmission and reception (Release 15); Apr. 2018.

Primary Examiner — Joel Ajayi
(74) Attorney, Agent, or Firm — Barnes & Thornburg LLP (57) ABSTRACT

A method for performing a handover process for a mobile radio network terminal in a mobile radio network. The method includes observing the transportation vehicle, predicting a travel route for the observed transportation vehicle, and informing the base station to which the transportation vehicle is logged on about the predicted travel route. A base station forwards the information about the predicted travel route to the base station of the cell to which the user equipment device in the observed transportation vehicle is logged on. This information is forwarded to a core network management component wherein an evaluation of the information about the predicted travel route takes place. The base station of the cell to which the observed transportation vehicle is travelling according to the predicted travel route (Continued)

is informed to prepare for taking over the user equipment from the passenger in the observed transportation vehicle in the handover process.

17 Claims, 4 Drawing Sheets

(51) Int. Cl.
  *H04W 36/30* (2009.01)
  *H04W 36/00* (2009.01)
  *H04W 8/26* (2009.01)
  *G08G 1/0968* (2006.01)
  *H04W 4/40* (2018.01)
  *H04L 29/08* (2006.01)

(52) U.S. Cl.
  CPC ............... *H04L 67/12* (2013.01); *H04W 4/40* (2018.02); *H04W 8/26* (2013.01); *H04W 36/0072* (2013.01); *H04W 36/00837* (2018.08); *H04W 36/305* (2018.08)

(58) Field of Classification Search
  USPC ........................................................ 455/437
  See application file for complete search history.

(56) References Cited

U.S. PATENT DOCUMENTS

| | | |
|---|---|---|
| 2018/0063261 A1 | 3/2018 | Moghe et al. |
| 2018/0146484 A1 | 5/2018 | Kahtava et al. |
| 2018/0184339 A1 | 6/2018 | Hehn et al. |
| 2018/0192270 A1 | 7/2018 | Schmitz et al. |
| 2019/0362508 A1* | 11/2019 | Anantha ........... H04W 72/0433 |

FOREIGN PATENT DOCUMENTS

| | | |
|---|---|---|
| GB | 2496165 A | 5/2013 |
| GB | 2548376 A | 9/2017 |

* cited by examiner

METHOD FOR PERFORMING A HANDOVER PROCESS FOR A MOBILE RADIO NETWORK TERMINAL IN A MOBILE RADIO NETWORK, CORRESPONDING APPARATUSES FOR PERFORMING THE METHOD, TRANSPORTATION VEHICLE AND CORE NETWORK MANAGEMENT DEVICE, AND CORRESPONDING COMPUTER PROGRAMS

PRIORITY CLAIM

This patent application claims priority to European Patent Application No. 18206635.7, filed 16 Nov. 2018, the disclosure of which is incorporated herein by reference in its entirety.

SUMMARY

Illustrative embodiments relate to a method for transferring a mobile network subscriber station in a handover process in a mobile network. The proposal further relates to a mobile radio network subscriber station and a mobile radio network management unit for use in the method, as well as a transportation vehicle.

BRIEF DESCRIPTION OF THE DRAWINGS

Disclosed embodiments are illustrated in the drawings and will be explained in more detail with reference to Figs, in which.

DETAILED DESCRIPTION

An important process in mobile communication in a mobile network is the handover process. The mobile network is a cellular network which is divided into mobile radio cells. Each mobile radio cell is served by a base station. In the handover process, also referred to as a handover procedure or hand-off, a mobile network subscriber station when moving through the radio cells is transferred from one radio cell to another during a telephone call or a data connection without interruption of this connection.

Currently, the following mobile technologies are applicable for mobile communication: 3GPP based UMTS, HSPA, LTE, and the upcoming 5G standards. For the transportation vehicle direct communication is mentioned sidelink communication according to LTE-V and 5G. The corresponding interface is called PC5 interface in 3GPP.

Typically, a handover procedure (national roaming) takes place depending on the channel quality and the state of the mobile radio network (quality of the radio channel, the utilization of the currently used cell, the distance to the base station). The most common reason for changing the radio cell in a cellular network is when a subscriber station UE (user equipment) moves to the edge of the service area of the associated base station (eNodeB) and moves into the coverage area of an adjacent mobile radio cell. Then, this subscriber station is forwarded by the mobile network operator to another base station with which he should connect to remain connected to the network.

If a person using a user equipment device is travelling in a transportation vehicle an efficient handover process is needed since the mobile communication cells may be crossed relatively fast because of the speed of the transportation vehicle.

The typical handover procedures specified in the respective mobile radio standard are based on measurements of the field strength or other parameters which describe the quality of the communication channel, also known as the CQI report (Channel Quality Indicator).

The amount of transportation vehicle to everything communication (V2X) is increasing. Nowadays transportation vehicles are equipped with communication modules, sometimes called on-board connectivity unit OCU. This is a kind of UE, which use cellular communication to improve some applications in transportation vehicles. Future transportation vehicles are going to have a detailed environmental model of their surroundings and can inform eNodeBs about a presumed cell workload. Thus eNodeBs can get benefits from their UEs.

Legacy transportation vehicles without V2X communication capability do not exchange any data with eNodeBs. However, the route of a legacy transportation vehicle can be important for the eNodeB management as there might be classical UEs in use by the passengers in the transportation vehicle. The route of a legacy transportation vehicle will influence the power adjustment of the neighbour cells by handovers, especially when a large number of these cars is heading toward this base station, thus increasing the future handover and the probability of having resource usage requirement.

From US 2004/0058678 A1 it is known to give an advance handover notice to a "target" base station of a group of mobile radio connections that will be soon be handed over to the target base station from a current, "serving" base station. This advance notice permits the target base station to reserve resources and prepare for the handovers of the mobile radio connections. In addition, the handover operation is initiated earlier than it would be otherwise. Early handover initiation is possible because the route of the moving transportation vehicle is known or is predictable, and therefore, the serving and target base stations are known or may be predicted in advance. In this way, the likelihood of successful handovers with no dropped calls is increased for mobile stations moving at high speed and/or together as a group.

From GB 2 496 165 A1 it is known to communicate future trajectories and movements of a subscriber station to a mobile radio network management unit and to consider it for resource planning. Also for the handover process, this is taken from a navigation system of the mobile subscriber and transmitted to the mobile operator route information. The mobile network management unit processing route information is referred to in the document as "Vehicle Location Control Entity" VLCE.

From DE 10 2016 226 045 A1 a mobile communication handover method which takes into account information about special equipment of the mobile telephone network subscriber station during a handover process for the mobile telephone network subscriber station is known. The information about special equipment of the mobile telephone network subscriber station is transmitted from the mobile telephone network subscriber station to a mobile telephone network management unit, which takes the information about the special equipment into account during the handover process. The benefit is that the transportation vehicle is passed on to the mobile radio cell in which it can reliably continue the transmission of the sensor data. Other radio cells to which the mobile station could be handed over, but for which the QoS requirements are not fulfilled are avoided.

From EP 2 088 818 A2 methods and systems for location-based prearranged hand-off are disclosed and may include pre-arranging hand-off of communication services with a mobile communication device (MCD) based on present and future locations of the MCD and the availability of wireless services in the locations. The MCD may include location-determining capability which may include one or more of: a global navigation satellite system, triangulation, and ultra-wideband positioning. A travel route of the MCD may be anticipated utilizing the locations. The travel route may traverse one or more wireless coverage areas and the hand-off of communication services with the MCD may be configured when the MCD is expected to enter a wireless coverage area with a desired network resource allocation, which may include one or more of: bandwidth, data transfer rate, cost, power requirements, channel conditions, quality of service, and secure communications capability. Configurable MCD attributes may include antennas, beam forming, codes, and modulation.

Disclosed embodiments improve the accuracy of the handover process such that superfluous eNodeB handover processes with superfluous cell power boot up processes are avoided. If traffic scenarios with legacy transportation vehicles, also called old-timers are concerned such problem may occur.

Normally, mobile cells are logically arranged as hexagons. If an UE is going to approach a cell border; the eNodeB informs the neighbouring cell about an UE handover via the X2 interface. The choice of the informed neighbour eNodeB is dependent on the UE position. If the UE is close to two neighbour cells, the eNodeB from cell can perform the handover toward the wrong cell and a new handover to the next cell would be required to correct this mistake. This is considered a problem which needs to be solved.

This is achieved by a method for performing a handover process for a mobile radio network terminal in a mobile radio network, by two apparatuses for performing the method, the corresponding transportation vehicle core network management device, and corresponding computer programs.

The newly developed systems for cooperative driving or autonomous driving are designed so that the transportation vehicles observe each other and also mutually inform each other about certain observations. Sensor data or derived observation data can also be exchanged between the transportation vehicles for this purpose.

In at least one disclosed embodiment, the proposal concerns a method for performing a handover process for a mobile radio network terminal in a mobile radio network, wherein the mobile radio network terminal is a user equipment device of a road participant moving on the road. Such road participant could be a passenger of an observed transportation vehicle. The method comprises observing the road participant with surroundings observation means, predicting a travel route for the road participant, and informing the base station to which the transportation vehicle with surroundings observation means is logged on about the predicted travel route. Moreover, the method comprises forwarding the information about the predicted travel route to the base station of the cell to which the user equipment device of the observed road participant is logged on, and evaluating the forwarded information about the predicted travel route, and informing the base station of the cell to which the observed road participant is travelling according to the predicted travel route to prepare for taking over the user equipment in the observed road participant in the handover process.

The proposed method has the following benefits: In the worst case scenario, the cell to which the handover happens mistakenly had no workload and therefore had adjusted the cell power to a minimum. To prepare for the announced handover process, an eNodeB boot up of the cell power is required for the purpose to perform the handover process. This procedure is inefficient also in terms of energy consumption, especially if the wrong cell was chosen for the handover process. Since there is much traffic on public roads, such erroneous handover could concern a large flock of UEs making the problem even worse. The proposed method reliably avoids such inefficient handover behaviour. Energy consumption is reduced and the overall network throughput is increased.

In at least one disclosed embodiment the observation means comprise surroundings sensors in an observer transportation vehicle which is further equipped with an on-board connectivity unit that supports mobile communication in the mobile radio network. It is noted that the observed transportation vehicle is not equipped with such on-board connectivity unit and concerns thus a legacy transportation vehicle hereinafter also called "oldtimer".

In another disclosed embodiment the observation means comprise surroundings sensors in an infrastructure component being equipped with a connectivity unit that supports mobile communication in the mobile radio network. The problem with a mistakenly performed handover process may happen in a situation where a road crossing is positioned at a cell border. In such case it is of great benefit to know beforehand which path a legacy device would take for the handover process. Therefore, according to this embodiment it is beneficial to install observation means at road crossings to support the handover processes.

In a further disclosed embodiment it is beneficial that the surroundings sensors comprise any one or more of a light detection and ranging sensor LIDAR, a radio detection and ranging sensor RADAR and a video camera. Such sensors take images which could be evaluated by image processing means to estimate a travel route of a road participant.

In this regard it is beneficial if the observation means further comprise a computing unit in which an evaluation of the information from the surroundings sensors is performed and the position of the observed road participant is estimated. The position could be estimated based on image processing and could be further enhanced by the use of a detailed surroundings map.

Here, it is also beneficial that the message with the information about the predicted travel route also includes an information about the estimated position of the observed road participant. This is important since the core network device needs to identify the UE of the road participant for preparing the handover process. This could best be done based on position information.

In this regard it is also relevant that the core network management device associates the information about the position of the road participant with an identification number or code of a user equipment device logged on to the base station of the cell to which the observed road participant is logged on.

In at least one disclosed embodiment it is beneficial if the association is performed based on a matching operation in which the estimated position of the observed road participant is matched with the positions of the user equipment devices logged to the base station of the cell to which the observed road participant is logged on. It is noted that the core network management device supporting the handover process regularly does not have any information about the identity of such legacy transportation vehicles.

Optionally, the identification number or code is any one or more of a telephone number, International Mobile Equipment Identity number IMEI, or International Mobile Subscriber Identity IMSI.

For one corresponding apparatus for performing the method according to the proposal it is beneficial that the apparatus comprises observation means and a processing device which is adapted to perform the operations of observing the road participant with surroundings observation means, predicting a travel route for the observed road participant, informing the base station to which the observer transportation vehicle is logged on about the predicted travel route, and forwarding the information about the predicted travel route to the base station of the cell to which the user equipment device in the observed road participant is logged on the corresponding benefits are existing as mentioned in connection with the corresponding method operations. Typically this processing device is a microcontroller, microprocessor or microcomputer.

In at least one disclosed embodiment it is beneficial to equip a transportation vehicle with such apparatus.

For another corresponding apparatus it is beneficial that it comprises a processing device which is adapted to perform the operations of evaluating the forwarded information about the predicted travel route, and informing the base station of the cell to which the observed road participant is travelling according to the predicted travel route to prepare for taking over the user equipment of the observed road participant in the handover process Likewise, it is beneficial to equip a core network device with such corresponding apparatus.

For a corresponding computer program it is beneficial that it comprises program code, which when run in a processing device performs the operations of evaluating data generated in the operation of observing the road participant with surroundings observation means, predicting a travel route for the observed road participant, and informing the base station to which the observer transportation vehicle is logged on about the predicted travel route.

For another corresponding apparatus it is beneficial that it comprises program code, which when run in a processing device performs the operations of evaluating the information about the predicted travel route, and informing the base station of the cell to which the observed road participant is travelling according to the predicted travel route to prepare for taking over the user equipment from the passenger in the observed road participant in the handover process.

The present description illustrates the principles of the disclosure. It will thus be understood that those skilled in the art will be able to devise various arrangements which, while not explicitly described herein, are intended to embody principles of the disclosure and to be equally limited in scope.

The present description illustrates the principles of the present disclosure. It will thus be appreciated that those skilled in the art will be able to devise various arrangements that, although not explicitly described or shown herein, embody the principles of the disclosure.

All examples and conditional language recited herein are intended for educational purposes to aid the reader in understanding the principles of the disclosure and the concepts contributed to furthering the art, and are to be construed as being without limitation to such specifically recited examples and conditions.

Moreover, all statements herein reciting principles and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the diagrams presented herein represent conceptual views of illustrative circuitry embodying the principles of the disclosure.

The functions of the various elements shown in the figures may be provided by the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, read only memory (ROM) for storing software, random access memory (RAM), and nonvolatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The disclosure as defined by such claims resides in the fact that the functionalities provided by the various recited means are combined and brought together in the manner which the claims call for. It is thus regarded that any means that can provide those functionalities are equivalent to those shown herein.

Figure 1:
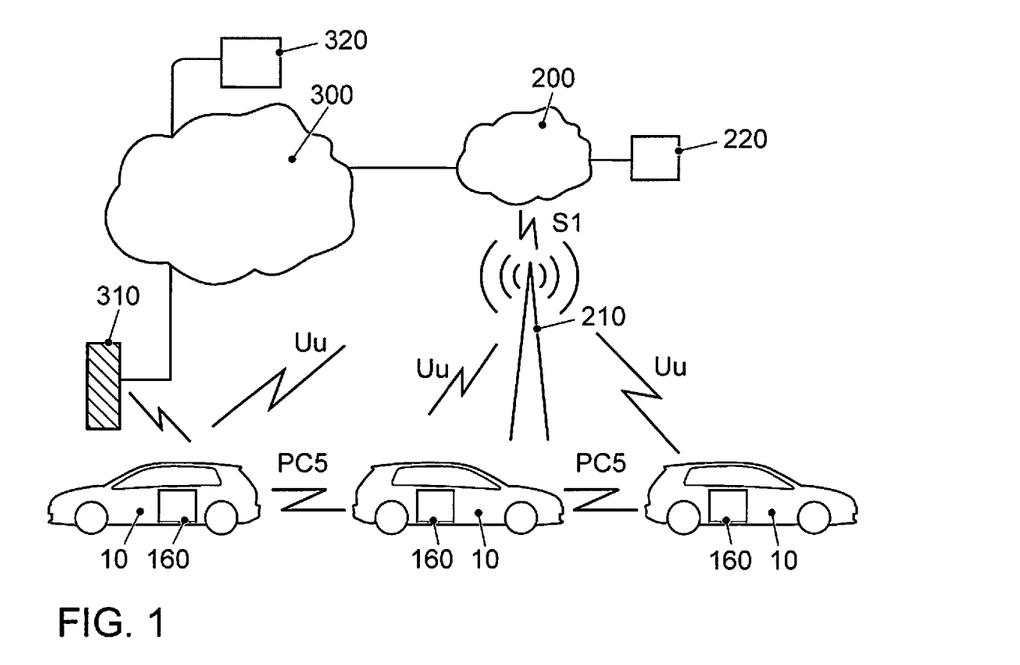
FIG. 1 shows the principle of transportation vehicle communication via mobile radio.

FIG. 1 shows the system architecture for the proposal. Reference number 10 denotes a transportation vehicle. The depicted transportation vehicle is exemplified as a passenger transportation vehicle, such as a car. It may be any type of a transportation vehicle. Examples of other types of transportation vehicles are: buses, motorcycles, commercial vehicles, in particular, trucks, agricultural machinery, construction machinery, rail vehicles, etc. The use of the disclosed embodiments would be generally in land transportation vehicles, rail transportation vehicles, watercrafts and aircrafts possible. The transportation vehicle 10 is equipped with an on-board connectivity module 160 including corresponding antenna such that the transportation vehicle 10 can participate in any form of a mobile communication service. FIG. 1 illustrates that transportation vehicle 10 may transmit and receive signals to and from a base station 210 of a mobile communication service provider.

Such base station 210 may be an eNodeB base station of an LTE or 5G mobile communication service provider. The base station 210 and the corresponding equipment is part of an LTE or 5G mobile communication network with a plurality of network cells where each cell is served by one base station 210.

The network architecture is explained based on the example of the LTE (Long Term Evolution) network architecture and comprises the three subsystems: the User Equipment (UE), the Access Network (AN) and the Core Network (CN).

In LTE networks the E-UTRAN is the Access Network for LTE; it uses OFDMA in the radio interface to communicate with the User Equipment. A so-called Evolved Packet Core (EPC) is used in the Core Network to provide an all-IP architecture to give access to various services e.g. Internet service. The UE can be a personal device, e.g. a smart phone, a smart watch, a tablet computer, notebook or laptop computer or the like.

The interconnection between the physical equipment in both the EPC and E-UTRAN is done through IP network-based technologies, so that the transport network is a conventional IP network. This way, any LTE network infrastructure contains IP elements such as routers, DHCP servers and DNS servers.

In LTE the IP packet transfer service between the UEs and an external network is called EPS Bearer Service. Likewise, the packet transfer service provided by the Access Network is called E-UTRAN Radio Access Bearer (ERAB).

The base station 210 in FIG. 1 is positioned close to a main road on which the transportation vehicles 10 are driving. In the terminology of LTE, a mobile terminal corresponds to a user equipment UE, which allows a user to access network services, connecting to the UTRAN or Evolved-UTRAN via the radio interface. Typically, such user equipment corresponds to a smart phone. Of course, mobile terminals are also used in the transportation vehicles 10. The transportation vehicles 10 are equipped with the on-board connectivity module OCU 160. This OCU corresponds to an LTE communication module with which the transportation vehicle 10 can receive mobile data in downstream direction and can send such data in upstream direction.

In terms of the LTE mobile communication system, the Evolved UMTS Terrestrial Radio Access Network E-UTRAN of LTE consists of a plurality of eNodeBs, providing the E-UTRA user plane (PDCP/RLC/MAC/PHY) and control plane (RRC) protocol terminations towards the UE. The eNodeBs are interconnected with each other by the so-called X2 interface. The eNodeBs are also connected by the so-called S1 interface to the EPC (Evolved Packet Core) 200, more specifically to the MME (Mobility Management Entity) by the S1-MME and to the Serving Gateway (S-GW) by the S1-U interface.

As FIG. 1 depicts, an E-UTRAN Access Network only contains ENodeBs that allow connectivity between the UEs and the EPC Core Network. A base station 210 communicates with the other elements of the system through 3 interfaces: E-UTRAN Uu, S1 and X2. The interface E-UTRAN Uu, also known as LTE Uu or simply LTE radio interface, allows data transfer between the ENodeB and the UEs. It is noted that the transportation vehicles 10 equipped with OCU unit 160 can also be regarded as UE devices. All the functions and protocols needed for this transfer and the control operations of the E-UTRAN Uu interface are implemented in the eNodeB. The eNodeB 210 connects with the EPC Core Network 200 through the S1 interface. Optionally, the eNodeBs 210 can connect between them using the X2 interface. These connections can be used to exchange signaling messages to handle the radio resources (e.g. to reduce interference) and also to manage traffic when users move from one eNodeB 210 to another during a handover procedure.

From this general architecture FIG. 1 shows that eNodeB 210 is connected to the EPC 200 via the S1 interface and that EPC 200 is connected to the Internet 300. The backend server 320 to which the transportation vehicles 10 may send messages to and receive messages from is also connected to the Internet 300. In the field of cooperative and autonomous driving the backend server 320 typically is located in a traffic control center. With reference number 220 a core network management device is labeled. The S1 interface may be realized with wireless communication technology such as with the help of microwave radio communication by directional antennas or wired communication technology based on fiber cables. Finally, an infrastructure network component is also shown. This may be exemplified by a road-side unit RSU 310. For the ease of implementation, it is considered that all components have assigned an Internet address, typically as an IPv6 address, such that the packets transporting messages between the components can be routed correspondingly.

The various interfaces of the 5G network architecture are standardized. It is particularly referred to the various specifications, which are publicly available for the sake of sufficiently disclosing further implementation details. As a modern example of a mobile radio standard, reference is made to the 3GPP initiative and the LTE standard (Long Term Evolution). Many of the associated ETSI specifications are available. As an example: ETSI TS 136 213 V13.0.0 (2016-05); Evolved Universal Terrestrial Radio Access (E-UTRA); Physical layer procedures (3GPP TS 36.213 version 13.0.0 Release 13) is mentioned.

LTE stands for high transmission rates and short response times. The increase in the transmission rate is achieved in LTE by better modulation methods, more flexible frequency usage and larger channel bandwidths. According to the specifications, LTE currently has a transmission rate of more than 300 MBit/s in the downlink and 75 MBit/s in the uplink per 20 MHz band and minus the overhead.

The transmission speed of LTE is essentially dependent on the frequency range, the channel width, the distance to the base station 20 and the number of participants within the mobile radio cell. The more users use the bandwidth at the same time, the lower the transmission rate per subscriber.

LTE uses scalable and individual channels so that several mobile devices can transmit data at the same time. In concrete terms, this means that when allocating resources, the frequency spectrum is divided and parts of the spectrum are assigned to individual devices for a specific time.

Special algorithms select the appropriate channels, taking into account the influences from the environment. In this case, only the carriers are used for transmission, which are the cheapest for the user at its respective location.

Figure 2:
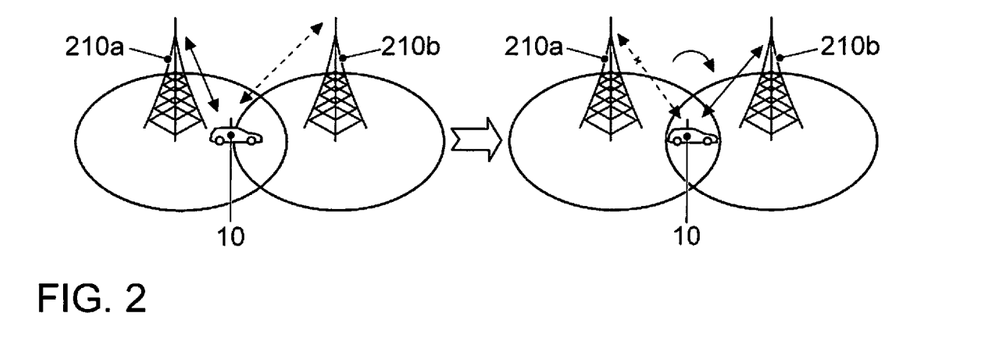
FIG. 2 shows the typical sequence of the handover process in which a mobile network subscriber station is passed from a mobile radio cell to the next mobile radio cell.

The principle of the handover operation is shown in FIG. 2. There are two adjacent base stations 210*a* and 210*b* between which a transportation vehicle 10 moves. The transportation vehicle 10 moves in the picture from left to right. The transportation vehicle 10 is registered at the beginning of the handover process as a mobile radio subscriber station at the base station 210*a*. As it approaches base station 210*b*, it receives its signals and also begins to communicate with base station 210b. If the received signal is strong enough and at the same time the received signal from the base station 210a has fallen below a threshold value, the radio cell of the base station 210b is checked in and then read out at the base station 210a. This process is shown in the right part of FIG. 2.

There are several handover techniques, some of which are briefly explained:

Distinction by Type of Connection Transition

Hard Handover

The existing connection to the current cell is completely disconnected before connecting to the new cell. Since GSM neighbour cells use different radio frequencies, GSM handovers are always hard handover techniques. The mobile device must change the transmission and reception frequency during the handover process.

Soft Handover

The connection to the new cell is established before the existing connection is disconnected. For a time there are two simultaneous connections to different cells. This method is used, for example, in UMTS. Neighbour cells usually use the same radio frequencies here.

The initiation of a handover process can take place in different ways. Nevertheless, these techniques have in common collecting measurement data for performing the handover process.

The terminal constantly measures the signal strength and quality of the current cell as well as the field strength of neighbouring cells—in GSM it measures the received signal strength of the Broadcast Control Channel (BCCH). The measurement results are sent to the Base Station Controller (BSC) (GSM every 480 ms). The BSC then makes the decision about the need for a handover. Before the handover can be performed, a suitable channel must be reserved by the BSC responsible for the target cell. Only when this has been successful can the BSC give the mobile network subscriber station the handover command.

In most mobile radio systems, there are plenty of system parameters that affect the beginning and the course of a handover. The matches to be made differ according to the type of handover. In UMTS, for example, the quality of the radio connection (call quality) can be improved at the expense of the network capacity by the mobile station being in soft handover more often, that is to say connected to several base stations more frequently at the same time. A simultaneous improvement in the quality of the radio connection and the network capacity can be achieved, for example, by optimizing the base station antenna parameters.

For LTE, reference is made to the standard regarding details of the handover process. The protocol for the handover procedure is specified in the specification ETSI TS 136 413 V12.3.0 (2014-09); Evolved Universal Terrestrial Radio Access Network (E-UTRAN); S1 Application Protocol (S1AP) (3GPP TS 36.413 version 12.3.0 Release 12).

Figure 3:
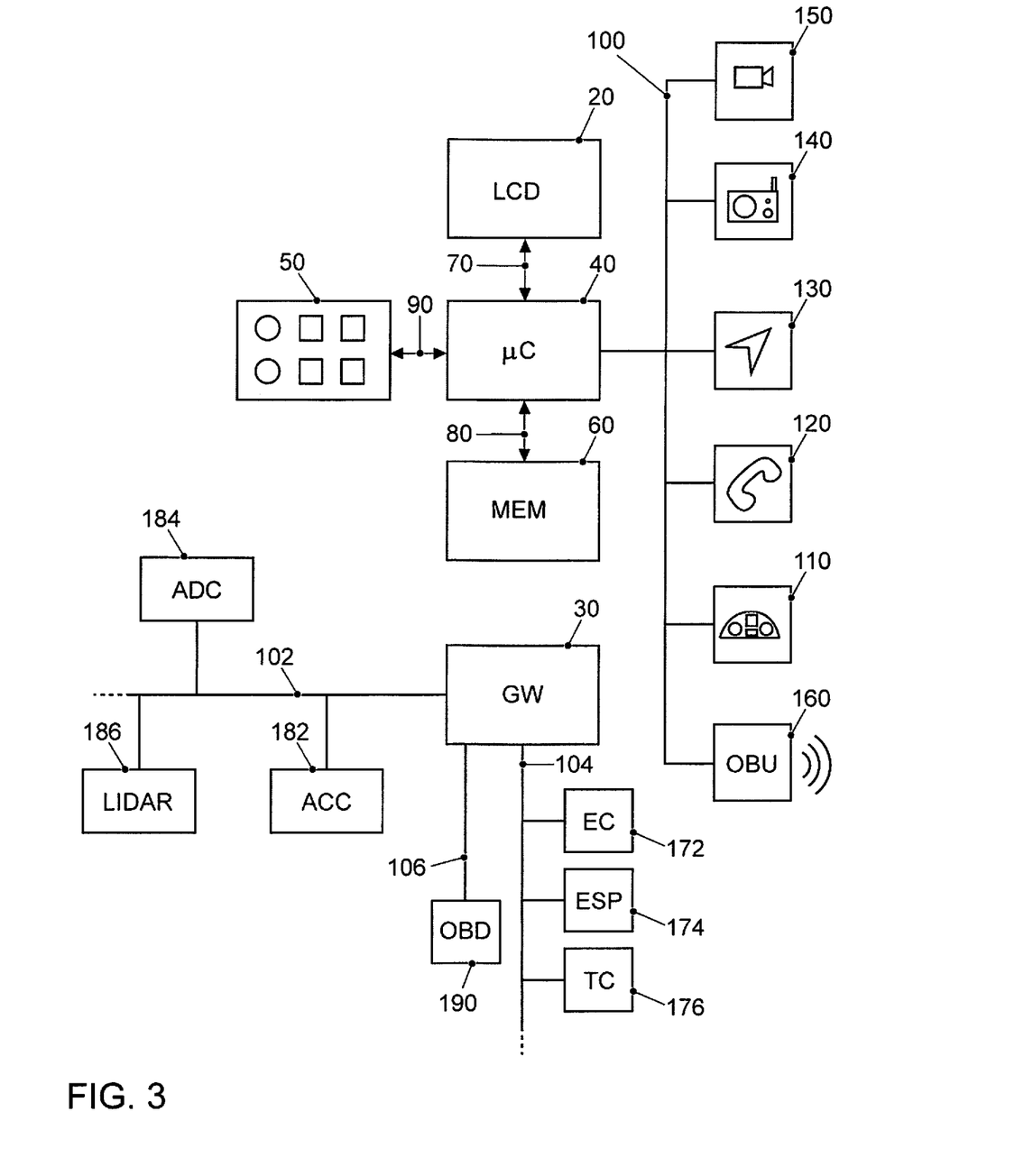
FIG. 3 shows a block diagram for the vehicle electronics of a transportation vehicle.

FIG. 3 shows schematically a block diagram of the transportation vehicle's 10 board electronics system. Part of the board electronics system is an infotainment system which comprises: the touch-sensitive display unit 20, a computing device 40, an input unit 50, and a memory 60. The display unit 20 includes both a display area for displaying variable graphical information and an operator interface (touch-sensitive layer) arranged above the display area for inputting commands by a user.

The memory device 60 is connected to the computing device 40 via a further data line 80. In the memory 60, a pictogram directory and/or symbol directory is deposited with the pictograms and/or symbols for possible overlays of additional information.

The other parts of the infotainment system such as camera 150, radio 140, navigation device 130, telephone 120 and instrument cluster 110 are connected via the data bus 100 with the computing device 40. As data bus 100 is the high-speed variant of the CAN bus according to ISO standard 11898-2 into consideration. Alternatively, for example, the use of an Ethernet-based bus system such as IEEE 802.03cg is another example. Bus systems in which the data transmission via optical fibers happens are also usable. Examples are the MOST Bus (Media Oriented System Transport) or the D2B Bus (Domestic Digital Bus). For inbound and outbound wireless communication, the transportation vehicle 10 is equipped with a communication module 160. This communication module 160 is often referred to as an on-board connectivity module OCU as mentioned above. It can be used for mobile communication, e.g. mobile communication according to the LTE standard, according to Long Term Evolution.

Reference numeral 172 denotes an engine control unit. The reference numeral 174 corresponds to an ESC control unit corresponding to electronic stability control and the reference numeral 176 denotes a transmission control unit. The networking of such control units, all of which are allocated to the category of the drive train, typically occurs with the CAN bus system (controller area network) 104. Since various sensors are installed in the motor transportation vehicle and these are no longer only connected to individual control units, such sensor data are also distributed via the bus system 104 to the individual control devices.

However, the modern motor transportation vehicle can also have further components such as further surroundings scanning sensors like a LIDAR (Light Detection and Ranging) sensor 186 or RADAR (Radio Detection and Ranging) sensor and more video cameras, e.g. as a front camera, rear camera or side camera. Such sensors are used more and more in transportation vehicles for surroundings observation. Further control devices, such as an automatic driving control unit ADC 184 and an adaptive cruise control unit ACC 182, etc., may be provided in the motor transportation vehicle. The RADAR and LIDAR sensors could be used for scanning a range up to 250 m or 150 m and the cameras cover a range from 30 to 120 m. The components 182 to 186 are connected to another communication bus 102. The Ethernet-Bus is a choice for this communication bus 102 due to its higher bandwidth for data transport. One Ethernet-Bus adapted to the special needs of car communication is standardized in the IEEE 802.1Q specification. Moreover, a lot of information for surroundings observation may be received via V2V communication from other road participants. For those road participants not being in line of sight LOS to the observing transportation vehicle it is very beneficial to receive the information about their position and motion via V2V communication.

Reference number 190 denotes an on-board diagnosis interface.

For the purpose of transmitting the transportation vehicle-relevant sensor data or derived data therefrom via the communication interface 160 to another transportation vehicle or to a central computer 320, or a core network device 220, the gateway 30 is provided. This is connected to the different bus systems 100, 102, 104 and 106. The gateway 30 is adapted to convert the data it receives via the one bus the transmission format of the other bus so that it can be distributed in the packets specified there. For the forwarding of this data to the outside, i.e., to another motor transportation vehicle or to central computer 320 or the core network device 220, the on-board unit 160 is equipped with the communication interface to receive these data packets and, in turn, to convert them into the transmission format of the correspondingly used mobile radio standard. The gateway 30 takes all the necessary format conversions if data are to be exchanged between the different bus systems if required.

Figure 4:
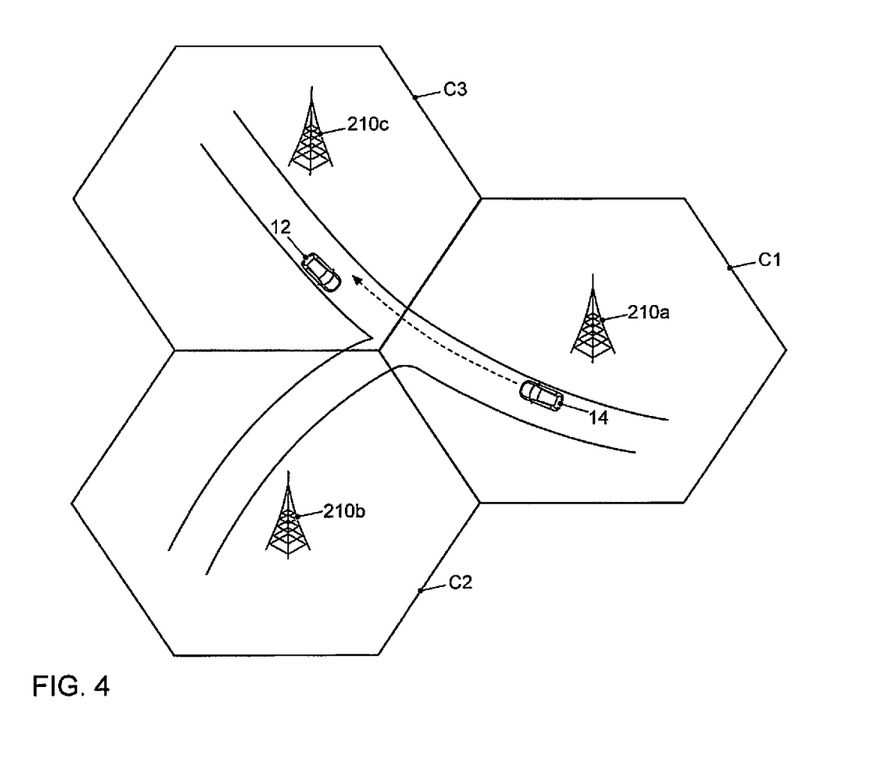
FIG. 4 shows a first example of a disclosed handover process.

Normally, mobile radio cells are arranged as shown in FIG. 4. Radio cells C1 to C3 are logically depicted as a hexagon. FIG. 4 shows that a legacy transportation vehicle 14 is driving on a road in radio cell C1. Legacy transportation vehicle here means that the transportation vehicle 14 is not equipped with an on-board communication unit. There are millions of transportation vehicles driving on the roads at present falling into this category, not only "oldtimers". But of course, the passengers inside these transportation vehicles 14 make use of UEs as well when travelling in the transportation vehicles 14. In a mobile communication system such as LTE or 5G if an UE is approaching a cell border; the eNodeB informs the neighbouring cell about an UE handover via the X2 interface. The informed neighbour eNodeB is dependent from the UE position. If the UE is close to two neighbour cells C2 and C3, the eNodeB from cell C1 needs to decide which eNodeB from which neighbour cell it wants to inform to perform the handover operation. In the situation depicted in FIG. 4 it may happen that the wrong eNodeB will be informed. The transportation vehicle 10 when approaching the cell border may take two different paths. It may go straight, thereby entering cell C3. It may also turn left, thereby entering radio cell C2. If eNodeB 210a of cell C1 informs the wrong eNodeB then a new handover operation to the right radio cell will be required.

To avoid this an observer transportation vehicle 12 will support the handover process. The observer transportation vehicle 12 is equipped with surroundings observing sensors 150, 186 as depicted in FIG. 3. Also it is equipped with an on-board connectivity unit 160. Since the observer transportation vehicle 12 is equipped with OCU 160 it will participate in V2V and V2X communication which includes a thorough message exchange between transportation vehicles such as in particular common awareness messages CAM which includes the reference position of the transportation vehicles broadcasting the CAM message. The format and use of CAM messages is standardized and it is referred to the ETSI standard ETSI TS 102 637-2 V1.2.1 (2011-03) for further details. Based on the observation of the approaching legacy transportation vehicle 14 and the recognition that CAM messages are missing from the observed transportation vehicle 14 the observer transportation vehicle 12 will learn that the approaching transportation vehicle 14 is a legacy transportation vehicle. What it does then is predicting the travel route for the observed legacy transportation vehicle 14. This could be performed in the following manner:

It periodically determines the position of the observed transportation vehicle. When it finds that the transportation vehicle 10 stays on the same lane when approaching the road crossing and does not blink to indicate a left turn, it predicts that the observed transportation vehicle will go straight and records a corresponding information about the predicted travel route. It then will inform the eNodeB 210c about this travel route. The term travel route here includes that just the information into which radio cell the observed legacy transportation vehicle 14 will move is transferred. ENodeB 210c hence informs a core network device 220 which is responsible for the handover preparation. In LTE, the core network device 220 is the mobility management entity MME which is part of the EPC. The message on the X2 interface which is directed to the core network device 220 contains the predicted travel route and also the current position of the observed legacy transportation vehicle 14.

The core network device 220 controls the handover process. The proposed handover mechanism comprises the following phases:

1. UE in legacy transportation vehicle 14 measures the signal power of neighbouring cells;
2. UE informs eNodeB 210a about the measurement results of operation at 1;
3. eNodeB 210a decides for preparation of an handover and informs the MME;
4. MME with the information about the predicted travel route and current position performs a matching operation to identify based on the list of position data the concerned UE/UE's; at this operation, MME holds a list of legacy transportation vehicles with their positions and routes (that have been transmitted by the observer transportation vehicle 12). It can then associate the known positions of its UEs to the position of the legacy transportation vehicles and their routes;
5. MME informs the chosen cell/eNodeB via X2 connection into which the concerned UE will move to prepare for the handover;
6. the chosen neighbour eNodeB prepares for handover.

Figure 5:
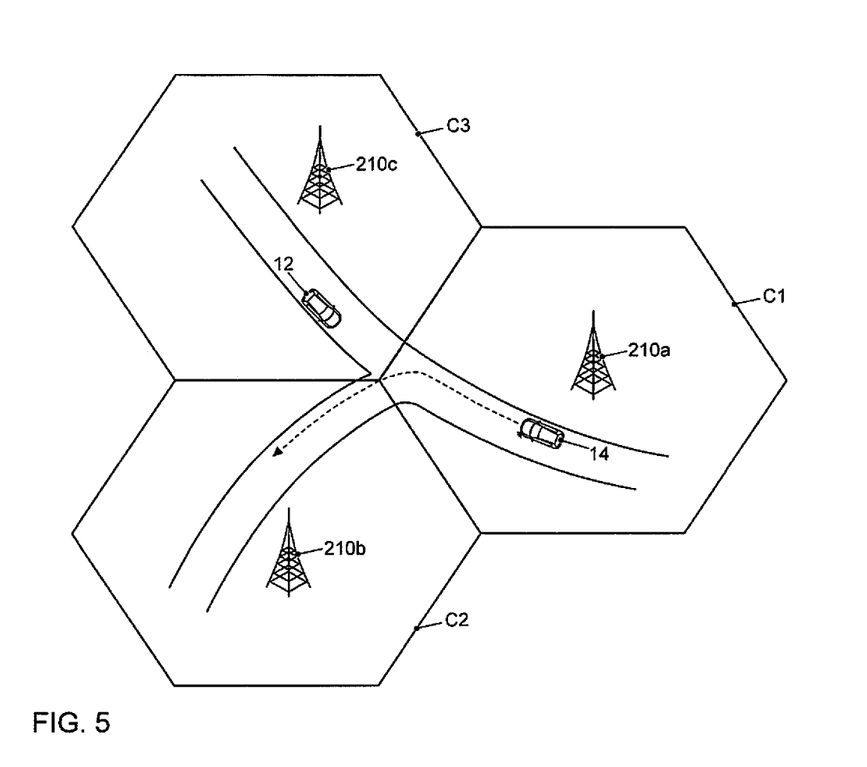
FIG. 5 shows a second example of a disclosed handover process.

In the depicted situation of FIG. 4 MME will inform eNodeB 210c to prepare for handover. In the depicted situation of FIG. 5 MME will inform eNodeB 210b to prepare for handover. In FIG. 5 it is also seen that the observed legacy transportation vehicle 14 is blinking to indicate a left turn from which the observer transportation vehicle is concludes that it will move into cell C2.

It is to be understood that the proposed method and apparatus may be implemented in various forms of hardware, software, firmware, special purpose processors, or a combination thereof. Special purpose processors may include application specific integrated circuits (ASICs), reduced instruction set computers (RISCs) and/or field programmable gate arrays (FPGAs). Optionally, the proposed method and apparatus is implemented as a combination of hardware and software. Moreover, the software may be implemented as an application program tangibly embodied on a program storage device. The application program may be uploaded to and executed by a machine comprising any suitable architecture. Optionally, the machine is implemented on a computer platform having hardware such as one or more central processing units (CPU), a random access memory (RAM), and input/output (I/O) interface(s). The computer platform also includes an operating system and microinstruction code. The various processes and functions described herein may either be part of the microinstruction code or part of the application program (or a combination thereof), which is executed via the operating system. In addition, various other peripheral devices may be connected to the computer platform such as an additional data storage device and a printing device.

It should be understood that the elements shown in the figures may be implemented in various forms of hardware, software or combinations thereof. Optionally, these elements are implemented in a combination of hardware and software on one or more appropriately programmed general-purpose devices, which may include a processor, memory and input/output interfaces. Herein, the phrase "coupled" is defined to mean directly connected to or indirectly connected with through one or more intermediate components. Such intermediate components may include both hardware and software based components.

It is to be further understood that, because some of the constituent system components and method operations depicted in the accompanying figures may be implemented in software, the actual connections between the system components (or the process operations) may differ depending upon the manner in which the proposed method and apparatus is programmed. Given the teachings herein, one of ordinary skill in the related art will be able to contemplate these and similar implementations or configurations of the proposed method and apparatus.

The disclosure is not restricted to the exemplary embodiments described here. There is scope for many different adaptations and developments, which are also considered to belong to the disclosure.

As mentioned before, the observation means including a processing device which evaluates the data from the observation means and predicts the travel route for the observed transportation vehicle could be installed in an infrastructure component positioned at road crossings. Of course this component would then inform the corresponding eNodeB.

REFERENCE SIGN LIST

10 Transportation vehicle
12 Observer Transportation Vehicle
14 Observed Transportation Vehicle
20 Touch Screen
30 Gateway
40 Computing Device
50 Operation Element Unit
60 Memory Unit
70 Data Line to Display Unit
80 Data Line to Memory Unit
90 Data Line to Operation Element Unit
100 1. Data Bus
102 2. Data Bus
104 3. Data Bus
106 4. Data Bus
110 Multifunction Display
120 Telephone
130 Navigation System
140 Radio
150 Camera
160 On-Board Connectivity Unit
172 Engine Control Device
174 Electronic Stability Control Device
176 Transmission Control Device
182 Distance Control Device
184 Drive Train Control Device
186 Lidar-Sensor
190 On-Board Diagnosis Connector
200 Evolved Packet Core
210 Base Station
210a 1. Base Station
210b 2. Base Station
210c 3. Base Station
220 Core Network Management Device
300 Internet
310 Road Side Unit
320 Backend Server
C1 1. Radio Cell
C2 2. Radio Cell
C3 3. Radio Cell

The invention claimed is:

1. A method for preparing for performance of a handover process for a mobile radio network terminal in a mobile radio network, the method comprising:
observing a first transportation vehicle travelling on a road using an observation sensor positioned on a second transportation vehicle to generate observation data, wherein the mobile radio network terminal is associated with and in possession of a user riding in the first transportation vehicle, wherein the first transportation vehicle lacks connectivity to communicate with the mobile radio network, wherein the second transportation vehicle includes an on-board connectivity unit that provides connectivity to communicate with the mobile radio network such that observation data generated by the observation sensor is communicated with the mobile radio network;
predicting travel route information about a travel route predicted for the mobile radio network terminal in the first transportation vehicle based on the observation data generated by the observation sensor on the second transportation vehicle;
forwarding the predicted travel route information to a base station of the mobile radio network presently handling communication of the mobile radio network terminal on the mobile radio network;
evaluating the predicted travel route information in a core network management component of the mobile radio network to determine which mobile radio network cell the mobile radio network terminal is travelling to based on the forwarded predicted travel route information; and
informing a base station of the mobile radio network cell of the mobile radio network to which the observed transportation vehicle is determined to be travelling according to the predicted travel route to prepare to take over communication with the mobile radio network terminal in the first transportation vehicle in the handover process,
wherein the observation sensor positioned on the second transportation vehicle comprises any one or more of a light detection and ranging sensor, a radio detection and ranging sensor, and a video camera.

2. The method of claim 1, wherein the predicting of the travel route information about the travel route predicted for the mobile radio network terminal in the first transportation vehicle is also based on observation data generated by an observation sensor included in a mobile radio network infrastructure component equipped with a connectivity unit that supports mobile communication in the mobile radio network.

3. The method of claim 1, wherein the evaluation of the predicted travel route information is performed by a computing unit included in the observation sensor on the second transportation vehicle, wherein the computing unit further estimates a position of the mobile radio network terminal travelling in the first transportation vehicle on the road.

4. The method of claim 3, wherein the information about the predicted travel route includes information about the estimated position of the first transportation vehicle.

5. The method of claim 3, further comprising associating, by the core network management component of the mobile radio network, the information about the position of the first transportation vehicle along with an identification number or code of the mobile radio network terminal located in the first transportation vehicle.

6. The method of claim 5, wherein the association is performed based on a matching operation in which the estimated position of the first transportation vehicle is matched with positions of mobile radio network terminals communicating through the base station currently handling communication for the mobile radio network terminal in the first transportation vehicle.

7. The method of claim 6, wherein the identification number or code is any one or more of a telephone number, an International Mobile Equipment Identity number, or an International Mobile Subscriber Identity.

8. Equipment for preparing for performance of a handover process for a mobile radio network terminal in a mobile radio network, wherein the equipment comprises:
an observation sensor positioned on a second transportation vehicle and configured to observe a first transportation vehicle travelling on a road to generate observation data, wherein the mobile radio network terminal is associated with and in possession of a user riding in the first transportation vehicle, wherein the first transportation vehicle lacks connectivity to communicate with the mobile radio network, wherein the second transportation vehicle includes an on-board connectivity unit that provides connectivity to communicate with the mobile radio network such that observation data generated by the observation sensor is communicated with the mobile radio network; and
a processing device configured to:
predict travel route information about a travel route predicted for the mobile radio network terminal in the first transportation vehicle based on the observation data generated by the observation sensor on the second transportation vehicle,
forward the predicted travel route information to a base station of the mobile radio network presently handling communication of the mobile radio network terminal on the mobile radio network to which the observer transportation vehicle is logged on about the predicted travel route of the road participant,
wherein the predicted travel route information enables determining which mobile radio network cell of the mobile radio network the mobile radio network terminal located in the first transportation vehicle is travelling to based on the forwarded predicted travel route information, whereby a notification is sent to a base station of the mobile radio network cell to which the first transportation vehicle is determined to be travelling according to the predicted travel route to prepare to take over communication with the mobile radio network terminal in the first transportation vehicle in the handover process, and
wherein the observation sensor positioned on the second transportation vehicle comprises any one or more of a light detection and ranging sensor, a radio detection and ranging sensor, and a video camera.

9. A transportation vehicle comprising the equipment of claim 8, thereby providing the second transportation vehicle of that claim.

10. A mobile radio network including a core network management component that receives information from the apparatus of claim 8, wherein the core network manage component is configured to associate information about an estimated position of the first transportation vehicle with an identification number or code of the mobile radio network terminal in the first transportation vehicle, wherein the estimated position of the first transportation vehicle is matched with positions of mobile radio network terminals communicating through the base station currently handling communication for the mobile radio network terminal in the first transportation vehicle.

11. The equipment of claim 8, wherein the prediction of the travel route information about the travel route predicted for the mobile radio network terminal in the first transportation vehicle is also based on observation data generated by an observation sensor included in an infrastructure component of the mobile radio network equipped with a connectivity unit that supports mobile communication in the mobile radio network.

12. The equipment of claim 8, wherein the observation sensor on the second transportation vehicle further comprises a computing unit in which evaluation of the information from the observation sensor is performed and a position of the mobile radio network terminal travelling in the first transportation vehicle on the road is estimated.

13. The equipment of claim 12, wherein the predicted travel route information includes the information about the estimated position of the first transportation vehicle.

14. The equipment of claim 12, wherein a core network management component of the mobile radio network associates the information about the position of the first transportation vehicle with an identification number or code of the mobile radio network terminal in the first transportation vehicle.

15. The equipment of claim 14, wherein the association is performed based on a matching operation in which the estimated position of the first transportation vehicle is matched with positions of mobile radio network terminals communicating through the base station currently handling communication for the mobile radio network terminal in the first transportation vehicle.

16. The equipment of claim 15, wherein the identification number or code is any one or more of a telephone number, an International Mobile Equipment Identity number, or an International Mobile Subscriber Identity.

17. A non-transitory computer readable medium that includes program code, which when run in a processing device, performs a process to prepare for performance of a handover process for a mobile radio network terminal in a mobile radio network, the process comprising:
observing a first transportation vehicle travelling on a road using an observation sensor positioned on a second transportation vehicle to generate observation data, wherein the mobile radio network terminal is associated with and in possession of a user riding in the first transportation vehicle, wherein the first transportation vehicle lacks connectivity to communicate with the mobile radio network, wherein the second transportation vehicle includes an on-board connectivity unit that provides connectivity to communicate with the mobile radio network such that observation data generated by the observation sensor is communicated with the mobile radio network;
predicting travel route information about a travel route predicted for the mobile radio network terminal in the first transportation vehicle based on the observation data generated by the observation sensor on the second transportation vehicle;
forwarding the predicted travel route information to a base station of the mobile radio network presently handling communication of the mobile radio network terminal on the mobile radio network;
evaluating the predicted travel route information in a core network management component of the mobile radio network to determine which mobile radio network cell the mobile radio network terminal is travelling to based on the forwarded predicted travel route information; and informing a base station of the mobile radio network cell of the mobile radio network to which the observed transportation vehicle is determined to be travelling according to the predicted travel route to prepare to take over communication with the mobile radio network terminal in the first transportation vehicle in the handover process, wherein the observation sensor positioned on the second transportation vehicle comprises any one or more of a light detection and ranging sensor, a radio detection and ranging sensor, and a video camera.

* * * * *